United States Patent
Timm

(12)
(10) Patent No.: US 7,996,040 B1
(45) Date of Patent: Aug. 9, 2011

(54) SYSTEM, METHOD AND COMPUTER PROGRAM PRODUCT FOR PROVIDING A CELLULAR TELEPHONE SYSTEM WITH AN INTEGRATED TELEVISION SIGNAL COMMUNICATION INTERFACE

(76) Inventor: Adam Timm, Park Ridge, IL (US)

( * ) Notice: Subject to any disclaimer, the term of this patent is extended or adjusted under 35 U.S.C. 154(b) by 491 days.

(21) Appl. No.: 12/082,232

(22) Filed: Apr. 9, 2008

Related U.S. Application Data

(60) Provisional application No. 60/923,542, filed on Apr. 16, 2007.

(51) Int. Cl.
*H04B 1/38* (2006.01)
*H04M 1/00* (2006.01)
(52) U.S. Cl. ............... 455/557; 455/419; 455/414.4; 455/41.2
(58) Field of Classification Search .................. 455/403, 455/414.1, 414.4, 3.06, 446, 41.2, 41.3, 502, 455/552.1, 557, 419, 418, 509, 566, 556.1, 455/550.1; 709/231; 342/464
See application file for complete search history.

(56) References Cited

U.S. PATENT DOCUMENTS

| | | | |
|---|---|---|---|
| 6,151,490 A * | 11/2000 | Schultheiss | 455/403 |
| 6,542,748 B2 | 4/2003 | Hendrey | |
| 6,587,739 B1 | 7/2003 | Abrams | |
| 6,759,946 B2 | 7/2004 | Sahinoglu | |
| 2004/0080454 A1 * | 4/2004 | Camp, Jr. | 342/464 |
| 2007/0255845 A1 * | 11/2007 | Bowen | 709/231 |

* cited by examiner

*Primary Examiner* — John Lee

(57) ABSTRACT

A cell phone communication system for transferring television audio and video data signals received from a television service provider to a peripheral device. The cell phone system includes a base station, a portable cell phone communicatively linked thereto, and a plurality of portable user interfaces communicatively linked to the base station and the cell phone for generating a plurality of instruction signals based upon receiving a plurality of user inputs. The cell phone system further includes a first communications link for transmitting the audio and video television data signals from the television service provider to the cell phone and a second communications link for transmitting the audio and video television data signals from the cell phone to the base station. The system further includes a third communications link for transmitting the verified television audio and video data signals to the television display screen.

9 Claims, 4 Drawing Sheets

SYSTEM, METHOD AND COMPUTER PROGRAM PRODUCT FOR PROVIDING A CELLULAR TELEPHONE SYSTEM WITH AN INTEGRATED TELEVISION SIGNAL COMMUNICATION INTERFACE

CROSS REFERENCE TO RELATED APPLICATIONS

This application claims the benefit of U.S. Provisional Application No. 60/923,542, filed Apr. 16, 2007, the entire disclosures of which are incorporated herein by reference.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Technical Field

This invention relates to communication data interfaces and, more particularly, to a system, method and software program product for transmitting television audio and video signals from a cell phone to a television screen that is not communicatively coupled to a cable service provider.

2. Prior Art

Cellular telephones are a ubiquitous of today's landscape. Millions of users, from children to little old ladies carry telephones. While often being a vital link between people, and also used for emergencies, such phones can also be used as a source of entertainment. Many phones offered today come equipped with a variety of ring-tones, the ability to play songs, and are also able to take and display pictures and short videos. Most of these phones however do not have the capability of playing for extended periods of time, and also are not equipped for picking up signals emitted by standard television stations for watching currently broadcast television programs. Based on the above mentioned needs, it would be advantageous to provide a means for displaying television programs on a cell phone screen.

U.S. Pat. No. 6,542,748 to Hendrey discloses a method and system for connecting proximately located telecommunications units. The method and system may be used in a location aware telecommunications system that can determine the location of a telecommunications unit (TU) being used within the system. A user of a mobile telecommunications unit (MU) is connected to a TU when the MU is within a predetermined distance of a predetermined geographic location meeting predefined criteria. The TU to which the MU is connected may be automated or manually operated. In some embodiments, multiple MUs are connected when they are within a predetermined proximity to each other and a predefined criteria is met. Unfortunately, this prior art example does not allow the user to receive communication directly from a television service provider, eliminating the ability to watch live streaming television from the device.

U.S. Pat. No. 6,587,739 to Abrams discloses a system of intelligent appliances coupled by common household power lines or wireless links. In particular, the system includes one of more of a kitchen console, a breadmaker, a slow cooker, and a rice cooker/steamer. One or more of the appliances serves as a system controller and may include a further communications interface for coupling to an external communications network, such as the telephone network. The system can thus be accessed and controlled remotely. The system can also communicate with and obtain information from remote sources such as Internet-based facilities. Unfortunately, this prior art example does not allow the user to receive communication directly from a television service provider, eliminating the ability to watch live streaming television from the device.

U.S. Pat. No. 6,759,946 to Sahinoglu discloses a network that enables remote users to communicate with, and to control a variety of devices whose only electrical connection is to a power line network. In hybrid networks, communications between different network domains is only available if proper message mapping is done. Message mapping leads to the determination of correct frame conversion based on the specifications of protocols identifying different networks. This invention comprises a method that does bi-directional conversion between application level information entered into the remote access device by the user and related physical layer power line communications frames. Unfortunately, this prior art example does not allow the user to receive communication directly from a television service provider, eliminating the ability to watch live streaming television from the device.

Accordingly, a need remains for a cellular telephone with integrated digital television receiver in order to overcome the above-noted shortcomings. The present invention satisfies such a need by providing a system that is convenient and easy to use, is lightweight yet durable in design, and provides a means for displaying television programs on a cell phone screen. Such a system provides consumers with the ability to watch their favorite television programs while on the go, via their cellular phones. Such convenience can provide hours of enjoyment for commuters, and keep them updated on the current news. The system is easy to use, and conveniently unites two of America's most valuable personal electronic devices; the television and the cellular phone. The combination provides functionality as well entertainment.

BRIEF SUMMARY OF THE INVENTION

The present invention meets the above-mentioned needs by providing a system, method, and computer program product to provide a cellular telephone system with a base station having an integrated television communication data interface for receiving and displaying television audio/video data signals on the cell phone screen as well as formatting and transferring the audio/video data signals to a television screen that is not directly connected to a conventional television service provider such as a local cable company or satellite TV company, for example. The present invention's system also includes software code logic for transmitting the audio and video television data signals in response to receiving a user request. Software code logic is provided for processing the user requests as well as formatting the television audio/video data signals and thereafter transferring such data signals to the television screen for viewing.

A cell phone communication system for transferring television audio and video data signals received from a television service provider to a peripheral device includes a base station, a portable cell phone communicatively linked thereto, and a plurality of portable user interfaces communicatively linked to the base station and the cell phone for generating a plurality of instruction signals based upon receiving a plurality of user inputs. The cell phone system further includes a first communications link for transmitting the audio and video television data signals from the television service provider to the cell phone and a second communications link for transmitting the audio and video television data signals from the cell phone to the base station. The system further includes a third communications link for transmitting the verified television audio and video data signals to the television display screen. The audio and video television data signals are simultaneously displayed and viewed on the cell phone and the television display screen while the television display screen is not in direct communication with the television service provider. Audio and video output ports are electrically coupled to the third communications link for segregating the audio and video television data signals during transmission over the third communications link.

The base station includes a mechanism for receiving and verifying the audio and video television data signals received from the cell phone and receiving and verifying mechanism. Such a receiving and verifying mechanism conveniently includes a transceiver housed within the base station that is in communication with the cell phone via the second communications link. The receiving and verifying mechanism further includes a communication data interface housed within the base station that is electrically coupled to the transceiver. Such a communication data interface includes a processor and a memory electrically coupled to the processor. Such a memory includes a software application program that verifies and formats the audio and video television data signals that are received from the cell phone via the second communications link. After the application program verifies and formats the data, the data is transmitted to the television screen via the third communications link.

The software application program includes and executes a control logic algorithm wherein upon receipt of one of the instruction signals, it requests the service provider to send the audio and video television data signals along with a random number for authentication purposes. Upon receipt of the audio and video television data signals and the random number, the software application program advantageously generates and sends command instructions to the cell phone. The control logic then transfers and stores the audio and video television data signals in the memory of the communications data interface. Upon receiving a first user request, the control logic displays the audio and video television data signals on the cell phone. Upon receiving a second user request, the cell phone returns the audio and video television data signals and the random number to the user, and then the user sends the audio and video television data signals back to the communication data interface.

The communication data interface effectively receives and evaluates the audio and video television data signals and prepares a control string for downloading the first application component of the control logic algorithm. Further, the communication data interface downloads the first application component of the control logic algorithm and determines which television channel has been selected by the user. The communication data interface further assigns a random number to each control within the control string by assigning a first encryption code to the first control within the control string and assigning subsequent encryption codes to subsequent controls of the control string based on preceding encryption codes of the preceding controls. The communication data interface then sends at least one of the encrypted control string and the encrypted controls to the cell phone. Upon receipt of the at least one encrypted control string and encrypted control, the data communication interface verifies at least one encrypted control and executes the instructions and thereby transmits the audio and video television data signals to the television display screen. A method for transferring television audio and video data signals between a cell phone and a television display screen includes the steps of: providing and communicatively linking a base station to a portable cell phone; providing and communicatively linking a plurality of portable user interfaces to the base station and the cell phone; the user interface generating a plurality of instruction signals based upon receiving a plurality of user inputs; providing first, second and third communications links; transmitting the audio and video television data signals from the television service provider to the cell phone; transmitting the audio and video television data signals from the cell phone to the base station; receiving and verifying the audio and video television data signals received from the cell phone; transmitting the verified television audio and video data signals to the television display screen; and simultaneously displaying the audio and video television data signals on the cell phone and the television display screen, while the television display screen is not in direct communication with the television service provider.

The method further includes the steps of: providing and housing a transceiver within the base station in such a manner that the transceiver is in communication with the cell phone via the second communications link; providing and housing a communication data interface within the base station such that the communication data interface is electrically coupled to the transceiver; providing a processor and a memory electrically coupled thereto, the memory including a software application program; the software application program verifying and formatting the audio and video television data signals received from the cell phone via the second communications link; the software application program transmits the audio and video television data signals to the television screen via the third communications link; providing and electrically coupling audio and video output ports to the third communications link; and the audio and video output ports segregate the audio and video television data signals during transmission over the third communications link.

Further, the software application program includes and executes a control logic algorithm including the steps of: upon receipt of one of the instruction signals, requesting the service provider to send the audio and video television data signals along with a random number for authentication purposes; upon receipt of the audio and video television data signals and the random number, generating and sending command instructions to the cell phone; retrieving the audio and video television data signals and the random number; transferring and storing the audio and video television data signals in the memory of the communications data interface; upon receiving a first user request, displaying the audio and video television data signals on the cell phone; upon receiving a second user request, the cell phone returning the audio and video television data signals and the random number to the user; and the user sending the audio and video television data signals back to the communication data interface.

Further, the control logic algorithm includes the steps of: the communication data interface receiving and evaluating the audio and video television data signals; preparing a control string for downloading a first application component of the control logic algorithm; downloading the first application component of the control logic algorithm; and determining which television channel has been selected by the user.

Further, the control logic algorithm includes the steps of: assigning a random number to each control within the control string; assigning a first encryption code to a first control within the control string; assigning subsequent encryption codes to subsequent controls of the control string based on preceding encryption codes of preceding controls respectively; sending at least one of the encrypted control string and the encrypted controls to the cell phone; upon receipt of the at least one encrypted control string and encrypted controls, sending instructions to the data communication interface; the data communication interface verifying the at least one encrypted control and encrypted controls respectively; and the data communication interface executing the instructions and thereby transmitting the audio and video television data signals to the television display screen.

BRIEF DESCRIPTION OF THE SEVERAL VIEWS OF THE DRAWING

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

DETAILED DESCRIPTION OF THE INVENTION

Figure 1:
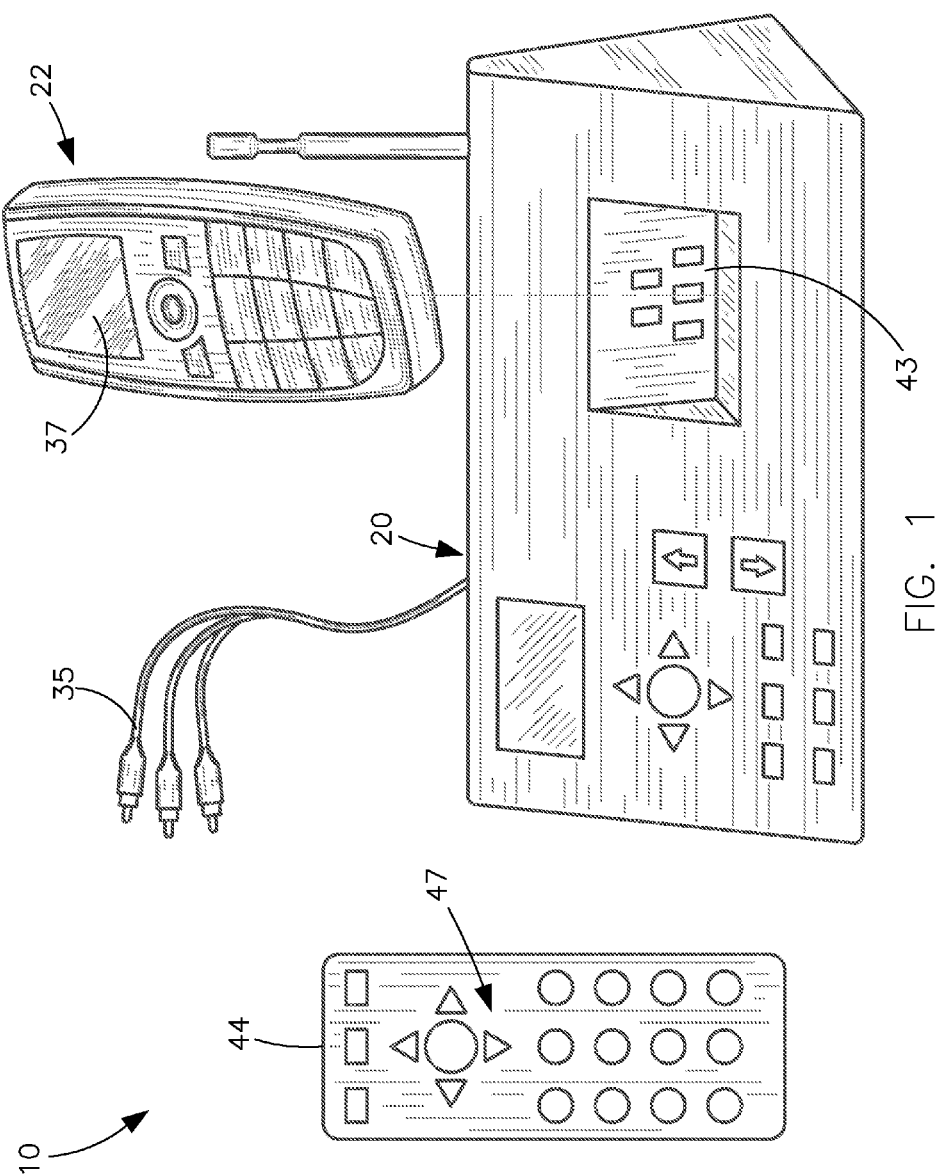
FIG. 1 is a perspective view of the base station and cell phone, in accordance with the present invention.

The present invention will now be described more fully hereinafter with reference to the accompanying drawings, in which a preferred embodiment of the invention is shown. This invention may, however, be embodied in many different forms and should not be construed as limited to the embodiment set forth herein. Rather, this embodiment is provided so that this application will be thorough and complete, and will fully convey the true scope of the invention to those skilled in the art. Like numbers refer to like elements throughout the figures.

The system and method of this invention is referred to generally in FIGS. 1-4 by the reference numeral 10 and is intended to provide a base station 20 having a communication data interface 21, a cell phone 22 and a plurality of communications links 23, 24, 33 for displaying television audio/video data signals on the cell phone display screen 37 as well as transferring the audio/video data signals to a television display screen 27 that is not directly connected to a conventional television service provider 11 such as a local cable company or satellite TV company, for example. It should be understood that the system 10, method and computer program application may be used to transmit and display many different types of television audio/video data signals and such not be limited to only conventional analog or digital signals, for example.

In particular, the present invention relates to a system 10, method, and computer program product for providing a communication data interface 21 that efficiently transfers television audio/video data signals from a cell phone 22 to a television screen 27 without the need to directly connect the television display screen 27 to a wall cable outlet, for example. In an embodiment of the present invention 10, a stand-alone application program is provided which serves as a control logic algorithm buffer that verifies and formats the television audio/video data signals after being received by the cell phone 22 and prior to being transmitted to the television screen 27. The application program allows a user (e.g., individual) to toggle between televisions channels and watch various programs on the television screen 27 while the television is not connected to any cable or satellite service provider 11. The application program allows the user to intelligently establish audio/video operating characteristics, such as volume, color, etc., via various user interfaces 12, such as a keyboard 45, mouse 45, remote controller, stereo headphones, etc.

In each of the two above-described alternate embodiments, the television audio/video data signals may be received, instead of locally or on proprietary equipment, via the global Internet. In such an embodiment, a user interface program would allow access, on a subscriber per-use basis, to access various television audio/video data signals via a World-Wide Web (WWW) site on the Internet.

Figure 2:
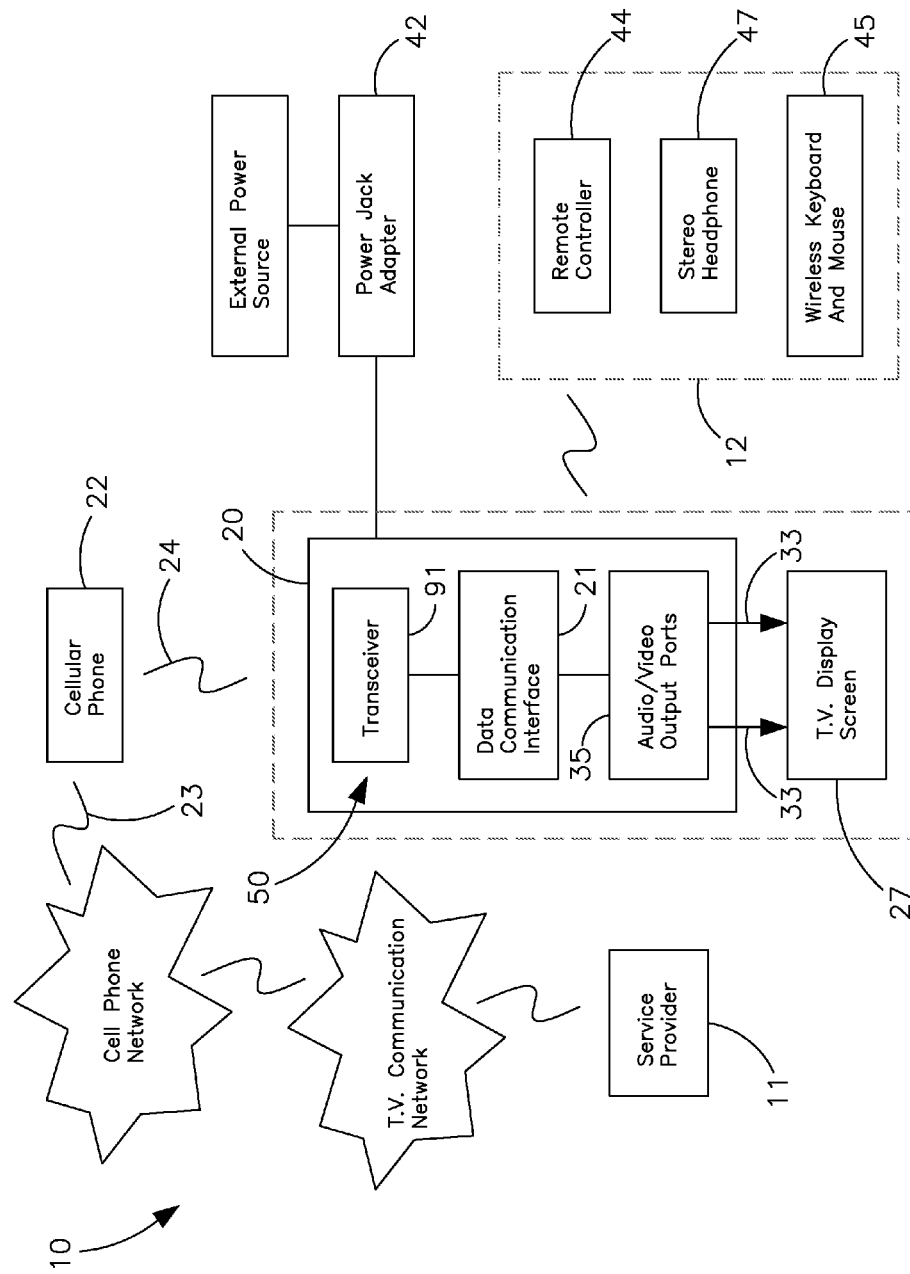
FIG. 2 is a high-level schematic block diagram view showing the interrelationship between the major components of the present invention.

Referring to FIG. 2, a high-level block diagram illustrates the interrelationship between the major components of the present invention, according to an embodiment of the present invention. In an exemplary embodiment, a user may enter a search string into a first input region of a GUI screen on the cell phone 22, for example, for a television audio/video data signal they desire to access. After the selected television audio/video data signal is received, the data communication interface 21 verifies and formats the television audio/video data signal to be displayed on the television screen 27. The cell phone 22 can include a display interface 28 that forwards graphics, text, and other data from the user generated instructions signals or service provider signals 11 (or from a frame buffer not shown) for display on the display unit 37 of the cell phone 22.

Referring initially to FIGS. 1, 2, 3 and 4 cell phone communication system 10 for transferring television audio and video data signals received from a television service provider 11 to a peripheral device. The cell phone system 10 includes a base station 20, a portable cell phone 22 communicatively linked thereto, and a plurality of portable user interfaces 12 communicatively linked to the base station 20 and the cell phone for generating a plurality of instruction signals based upon receiving a plurality of user inputs. The cell phone system 10 further includes a first communications link 23 for transmitting the audio and video television data signals from the television service provider to the cell phone 22 and a second communications link 24 for transmitting the audio and video television data signals from the cell phone 22 to the base station 20. The system 10 further includes a third communications link 33 for transmitting the verified television audio and video data signals to the television display screen 27.

The audio and video television data signals are simultaneously displayed and viewed on the cell phone 22 and the television display screen, 27 while the television display screen 27 is not in direct communication with the television service provider 11. Audio and video output ports 34 are electrically coupled to the third communications link 33 for segregating the audio and video television data signals during transmission over the third communications link 33.

Figure 4:
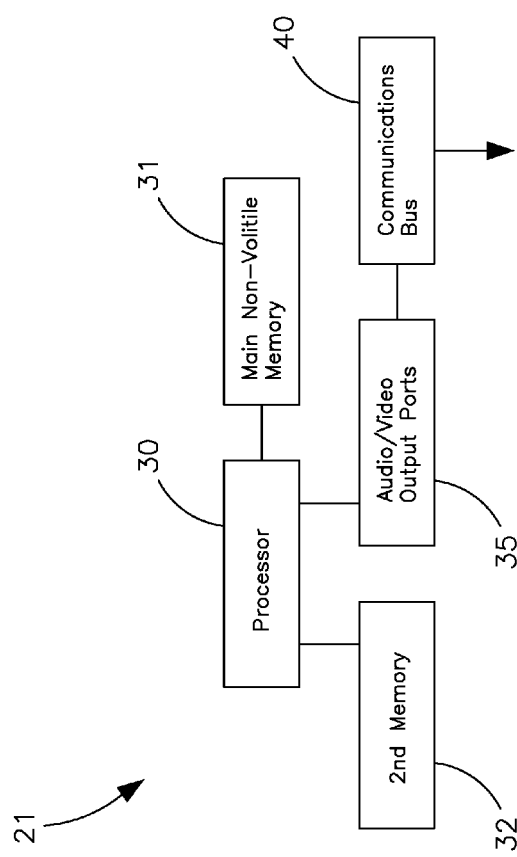
FIG. 4 is a schematic block diagram showing the interrelationship between the major components of the communication data interface.

Referring to FIGS. 2 and 4, the base station 20 includes a mechanism 50 for receiving and verifying the audio and video television data signals received from the cell phone. Such a receiving and verifying mechanism 50 includes a transceiver 91 housed within the base station 20 that is in communication with the cell phone 22 via the second communications link 24. The receiving and verifying mechanism 50 further includes a communication data interface 21 housed within the base station 20 that is electrically coupled to the transceiver 91. Such a communication data interface 21 includes a processor 30 and a memory 31 electrically coupled to the processor 30. Such a memory 31 includes a software application program that verifies and formats the audio and video television data signals that are received from the cell phone 22 via the second communications link 24. After the application program verifies and formats the data, the data is transmitted to the television screen 27 via the third communications link 33.

Figure 3:
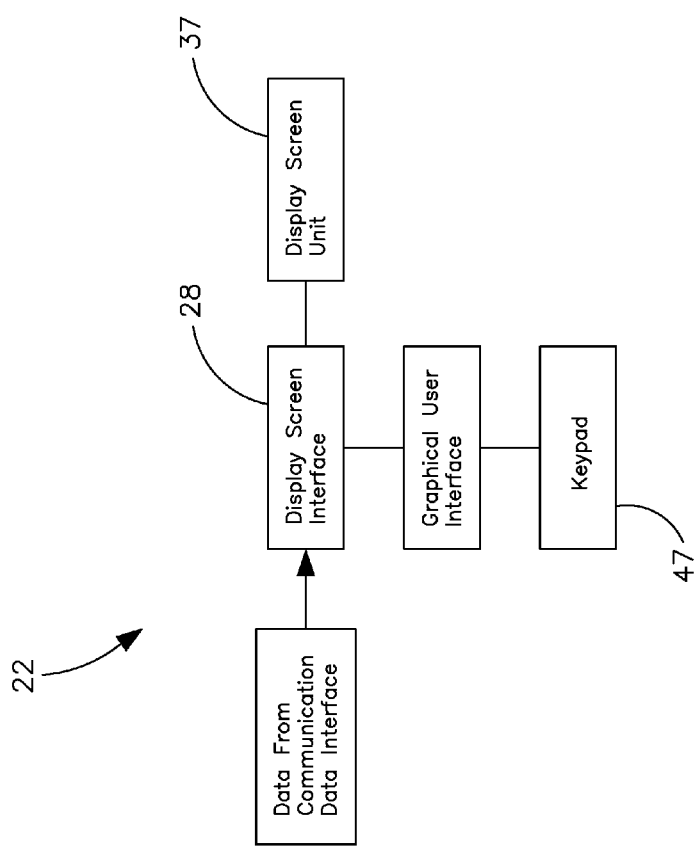
FIG. 3 is a schematic block diagram showing the interrelationship between the major components of the cell phone.

Referring to FIGS. 2 and 3, the software application program includes and executes a control logic algorithm wherein upon receipt of one of the instruction signals, it requests the service provider 11 to send the audio and video television data signals along with a random number for authentication purposes. Upon receipt of the audio and video television data signals and the random number, the software application program generates and sends command instructions to the cell phone 22. The control logic algorithm transfers and stores the audio and video television data signals in the memory 31 of the communications data interface 21. Upon receiving a first user request, the control logic displays the audio and video television data signals on the cell phone 22. Upon receiving a second user request, the cell phone 22 returns the audio and video television data signals and the random number to the user, and then the user sends the audio and video television data signals back to the communication data interface 21.

The communication data interface 21 receives and evaluates the audio and video television data signals and prepares a control string for downloading the first application component of the control logic algorithm. Further, the communication data interface 21 downloads the first application component of the control logic algorithm and determines which television channel has been selected by the user. The communication data interface 21 further assigns a random number to each control within the control string by assigning a first encryption code to the first control within the control string and assigning subsequent encryption codes to subsequent controls of the control string based on preceding encryption codes of the preceding controls. The communication data interface 21 then sends at least one of the encrypted control string and the encrypted controls to the cell phone 22. Upon receipt of the at least one encrypted control string and encrypted control, the data communication interface 21 verifies at least one encrypted control and executes the instructions and thereby transmits the audio and video television data signals to the television display screen 27.

Referring to the figures in general, in a preferred embodiment the system 10 includes an innovative electronic combination comprised of four separate units; a cellular telephone 22, a recharging/TV interface unit 41, a remote control unit 44, and a wireless keyboard and mouse 45 on one keypad 46. The cellular telephone 22 is capable of telephone communications and receiving and displaying television programs. To accomplish this, the system 10 includes audio and video connection ports 35 on the side of the housing which are used to connect signal cables to a TV. An external power jack 42 and a stereo headphone are 47 also provided.

The system 10 may, in a preferred embodiment, also be equipped with an infrared receiver which is used in conjunction with the remote control unit 44 and the wireless keyboard and mouse 45. The recharging unit 43 is for recharging the cell phone battery and for interfacing with the television to supply audio and video signals when the cell phone is 'docked' in the recharging unit 43. The remote control unit 44, like conventional television remote controls, is equipped with an infrared transmitter and a key pad 47 that are used to transmit infrared signals to select programming or adjust volume. The remote unit controls speaker phone calls or television program selection and volume.

The present invention, as claimed, provides the unexpected and unpredictable benefit of a system that is convenient and easy to use, is lightweight yet durable in design, and provides a means for displaying television programs on a cell phone screen. Such a system provides consumers with the ability to watch their favorite television programs while on the go, via their cellular phones. Such convenience can provide hours of enjoyment for commuters, and keep them updated on the current news. The system 10 is easy to use, and conveniently unites two of America's most valuable personal electronic devices; the television and the cellular phone. The combination provides functionality as well as entertainment.

The present invention 10 (system, process, application program or any part(s) thereof) may be implemented using hardware, software or a combination thereof and may be implemented in one or more cell phones 22 or other processing systems. In fact, in one embodiment, the invention may be directed toward one or more cell phones 22 capable of carrying out the functionality described herein.

In an exemplary embodiment, the base station 20 preferably includes the communication data interface 21, which includes a processor 30 connected to a communications bus 40, cross-over bar, or network, for example. The communication data interface 21 preferably includes a main memory 31, preferably random access memory (RAM), and may also include a secondary memory 32 including a computer usable storage medium having stored therein computer software and/or data, such as television audio/video data signals, for example.

In alternative embodiments, secondary memory 32 may include other similar means for allowing computer programs or other instructions to be loaded into communication data interface 21. Such means may include, for example, a removable storage unit. Examples of such may include a program memory cards (found in camera/video camera devices), a removable memory chip (such as an EPROM, or PROM) and associated socket, and other removable storage units and interfaces which allow software and television audio/video data signals to be transferred from the removable storage unit to the cell phone system.

The aforementioned communication data interface 21 allows television audio/video data signals to be transferred between cell phone 22 and an external display screen such as the television display screen 27, for example. Components of the communications data interface 21 may include audio/video output ports 90 and associated cables, a network interface, (such as an Ethernet card), a communications port, a PCMCIA slot and card, etc. Software and television audio/video data signals transferred via communications data interface 21 are in the form of separate signals which may be electronic, electromagnetic, optical or other signals capable of being received by communications data interface 21. These formatted audio and video television data signals are transmitted from communications data interface 21 via a communications link 33 (i.e., audio/video output ports and communications bus) to the television display screen 27. This link 33 (referred to as the third link hereinbelow) carries the signals and may be implemented using wire or cable, fiber optics, a phone line, a cellular phone link, an RF link and other communications channels.

Various software embodiments are described in terms of this exemplary cell phone 22. After reading this description, it will become apparent to a person skilled in the relevant art(s) how to implement the invention using other cell phone 22 and/or cell phone architectures. In this document, the terms "computer program medium" and "computer usable medium" are used to generally refer to software program algorithms that receive, verify and format the television audio/video data signals. These computer program products are means for providing audio/video image and sounds data between cell phone 22, base station 20 and television screen 27.

The computer program mediums are stored in main memory 31 and/or secondary memory 32. The computer program mediums may also be received via the first communications link 23 from the service provider 11. Such computer program mediums, when executed, enable the cell phone 22 and base station 20 to perform the features of the present invention as discussed herein. In particular, the computer programs, when executed, enable the processor 30 to perform data verification and formatting features of the present invention so that television audio/video data signals can be simultaneously displayed and viewed on the cell phone display screen 37 as well as the television display screen 27. Accordingly, such computer programs represent controllers of the present invention's system 10.

In an embodiment where the invention is implemented using software, the software may be stored in a readable computer program medium and loaded into cell phone 22 and/or base station 20 using removable storage drives or communications interface 91. The control logic (software), when executed by the processor 30, causes the processor 30 to perform the functions of the invention as described herein.

The functions of the computer present invention are to download, segment and format television audio/video data signals cable server between a cell phone 22 and a television display screen 27. The cell phone user establishes communication with a television audio/video data signal service provider 11. The user sends a request to the service provider 11 for an audio/video application component (first application component) to be displayed on the cell phone display screen 37. The user and service provider 11 communicate preferentially via TCP/IP or HTTP, or other well known and suitable communications protocols.

The service provider 11 sends a response to the user with the request to transmit the television audio/video data signals and, where appropriate, a random number for authentication purposes. The television audio/video data signals as a minimum contain data relating to the television audio/video data signals type and the television audio/video data signals channel. The user receives the response from the service provider 11 and sends appropriate command instructions to the cell phone 22 in order to retrieve the television audio/video data signals and, where appropriate, a random number. The television audio/video data signals are transferred and stored in the nonvolatile memory 31 of the communications data interface 21 and can be viewed on the cell phone display screen 37 by means of suitable commands. The cell phone 22 receives the commands and returns television audio/video data signals and, where appropriate, the random number to the user. The user sends these data in a request to the communication data interface 21.

The communication data interface 21 receives the request and evaluates the television audio/video data signals to find out which channel has been selected, or to derive the necessary audio/video channel information, in order to be able to download the first application component. The channel information is used to prepare a control string for downloading the first application component from the service provider 11 to the cell phone 22. This control string causes the first application component to be created on the cell phone 22. The control string is a predefined string stored in the nonvolatile memory 31 area of the base station 20 for a specific application.

A further embodiment of the invention is that the control string is created in whole or in part with the aid of a program server hosted by the service provider 11. This is preferentially applied where audio/video communication data signals are also to be integrated into cell phone application component by means of the control string. Preferentially each control within the string is signed with the aid of the random number and encrypted as necessary. This can be achieved, for example, by assigning a first control within the string a message authentication code with the aid of the random number, and assigning all subsequent commands a message authentication code based on the message authentication codes of a preceding control and random number. The string with the signature and, where appropriate, encrypted controls are sent to the user cell phone 22.

The user receives the response with the control string and sends the instructions consecutively to the data communication interface 21. The data communication interface 21 verifies the signed/encrypted controls and executes the instructions to transmit the audio/video television data signals to the television screen 27 via the audio/video output ports 35 and cables, when the signature is correct.

In use, a method for transferring television audio and video data signals between a cell phone 22 and a television display screen 27 includes the steps of: providing and communicatively linking a base station 20 to a portable cell phone; providing and communicatively linking a plurality of portable user interfaces 21 to the base station 20 and the cell phone 22; the user interface 21 generating a plurality of instruction signals based upon receiving a plurality of user inputs; providing first, second and third communications links 23, 24, 33; transmitting the audio and video television data signals from the television service provider 11 to the cell phone 22; transmitting the audio and video television data signals from the cell phone 22 to the base station 20; receiving and verifying the audio and video television data signals received from the cell phone 22; transmitting the verified television audio and video data signals to the television display screen 27; and simultaneously displaying the audio and video television data signals on the cell phone 22 and the television display screen 27, while the television display screen 27 is not in direct communication with the television service provider 11.

In use, the method further includes the steps of: providing and housing a transceiver 91 within the base station 20 in such a manner that the transceiver 91 is in communication with the cell phone 22 via the second communications link 24; providing and housing a communication data interface 21 within the base station 20 such that the communication data interface 21 is electrically coupled to the transceiver 91; providing a processor 30 and a memory 31 electrically coupled thereto, the memory 31 including a software application program; the software application program verifies and formats the audio and video television data signals received from the cell phone 22 via the second communications link 24; the software application program transmitting the audio and video television data signals to the television screen 27 via the third communications link 33; providing and electrically coupling audio and video output ports to the third communications link 33; and the audio and video output ports 35 segregate the audio and video television data signals during transmission over the third communications link 33.

In use, the software application program includes and executes a control logic algorithm including the steps of: upon receipt of one of the instruction signals, requesting the service provider 11 to send the audio and video television data signals along with a random number for authentication purposes; upon receipt of the audio and video television data signals and the random number, generating and sending command instructions to the cell phone 22; retrieving the audio and video television data signals and the random number; transferring and storing the audio and video television data signals in the memory 31 of the communications data interface 21; upon receiving a first user request, displaying the audio and video television data signals on the cell phone 22; upon receiving a second user request, the cell phone 22 returning the audio and video television data signals and the random number to the user; and the user sending the audio and video television data signals back to the communication data interface 21.

In use, the control logic algorithm further includes the steps of: the communication data interface 21 receiving and evaluating the audio and video television data signals; preparing a control string for downloading a first application component of the control logic algorithm; downloading the first application component of the control logic algorithm; and determining which television channel has been selected by the user.

In use, the control logic algorithm further includes the steps of: assigning a random number to each control within the control string; assigning a first encryption code to a first control within the control string; assigning subsequent encryption codes to subsequent controls of the control string based on preceding encryption codes of preceding controls respectively; sending at least one of the encrypted control string and the encrypted controls to the cell phone; upon receipt of the at least one encrypted control string and encrypted controls, sending instructions to the data communication interface 21; the data communication interface 21 verifying the at least one encrypted control and encrypted controls respectively; and the data communication interface 21 executing the instructions and thereby transmitting the audio and video television data signals to the television display screen 27. Functions and process steps described herein may be performed using programmed computer devices and related hardware, peripherals, equipment and networks. When programmed, the computing devices are configured to perform functions and carry out steps in accordance with principles of the invention. Such programming may comprise operating systems, software applications, software modules, scripts, files, data, digital signal processors (DSP), application-specific integrated circuit (ASIC), discrete gate logic, or other hardware, firmware, or any conventional programmable software, collectively referred to herein as a module.

While the invention has been described with respect to a certain specific embodiment, it will be appreciated that many modifications and changes may be made by those skilled in the art without departing from the spirit of the invention. It is intended, therefore, by the appended claims to cover all such modifications and changes as fall within the true spirit and scope of the invention.

In particular, with respect to the above description, it is to be realized that the optimum dimensional relationships for the parts of the present invention may include variations in size, materials, shape, form, function and manner of operation. The assembly and use of the present invention are deemed readily apparent and obvious to one skilled in the art.

What is claimed as new and what is desired to secure by Letters Patent of the United States is:

1. A cell phone communication system for transferring television audio and video data signals received from a television service provider to a peripheral device, said cell phone system comprising:

a base station and a portable cell phone communicatively linked thereto;

a plurality of portable user interfaces communicatively linked to said base station and said cell phone for generating a plurality of instructions signals based upon receiving a plurality of user inputs;

a first communications link for transmitting the audio and video television data signals from the television service provider to said cell phone;

a second communications link for transmitting the audio and video television data signals from said cell phone to said base station;

said base station comprising means for receiving and verifying said audio and video television data signals received from said cell phone;

a third communications link for transmitting the verified television audio and video data signals to said television display screen;

wherein said receiving and verifying means comprises:

a transceiver housed within said base station and being in communication with said cell phone via said second communications link;

a communication data interface housed within said base station and being electrically coupled to said transceiver, said communication data interface comprising a processor and a memory electrically coupled to said processor, said memory including a software application program that verifies and formats the audio and video television data signals received from said cell phone via said second communications link and prior to being transmitted to the television screen via said third communications link; and audio and video output ports electrically coupled to said third communications link for segregating the audio and video television data signals during transmission over said third communications link;

wherein said software application program comprises and executes a control logic algorithm including the steps of upon receipt of one of said instruction signals, requesting the service provider to send the audio and video television data signals along with a random number along with for authentication purposes;

upon receipt of the audio and video television data signals and said random number, generating and sending command instructions to said cell phone;

retrieving the audio and video television data signals and said random number;

transferring and storing the audio and video television data signals in said memory of said communications data interface;

upon receiving a first user request, displaying the audio and video television data signals on said cell phone;

upon receiving a second user request, said cell phone returning the audio and video television data signals and said random number to the user; and said user sending the audio and video television data signals back to said communication data interface.

2. The cell phone communication system of claim 1, further including the steps of
   said communication data interface receiving and evaluating the audio and video television data signals;
   preparing a control string for downloading a first application component of said control logic algorithm;
   downloading said first application component of said control logic algorithm; and
   determining which television channel has been selected by the user.

3. The cell phone communication system of claim 2, further including the steps of
   assigning a random number to each control within said control string;
   assigning a first encryption code to a first control within said control string
   assigning subsequent encryption codes to subsequent controls of said control string based on preceding encryption codes of preceding controls respectively;
   sending at least one of said encrypted control string and said encrypted controls to said cell phone;
   upon receipt of said at least one encrypted control string and encrypted controls, sending instructions to said data communication interface;
   said data communication interface verifying said at least one encrypted control and encrypted controls respectively; and
   said data communication interface executing said instructions and thereby transmitting the audio and video television data signals to said television display screen.

4. A cell phone communication system for transferring television audio and video data signals received from a television service provider to a peripheral device, said cell phone system comprising:
   a base station and a portable cell phone communicatively linked thereto;
   a plurality of portable user interfaces communicatively linked to said base station and said cell phone for generating a plurality of instructions signals based upon receiving a plurality of user inputs;
   a first communications link for transmitting the audio and video television data signals from the television service provider to said cell phone;
   a second communications link for transmitting the audio and video television data signals from said cell phone to said base station;
   said base station comprising means for receiving and verifying said audio and video television data signals received from said cell phone;
   a third communications link for transmitting the verified television audio and video data signals to said television display screen;
   wherein the audio and video television data signals are simultaneously displayed and viewed on said cell phone and said television display screen while said television display screen is not in direct communication with the television service provider;
   wherein said receiving and verifying means comprises:
   a transceiver housed within said base station and being in communication with said cell phone via said second communications link;
   a communication data interface housed within said base station and being electrically coupled to said transceiver, said communication data interface comprising a processor and a memory electrically coupled to said processor, said memory including a software application program that verifies and formats the audio and video television data signals received from said cell phone via said second communications link and prior to being transmitted to the television screen via said third communications link; and
   audio and video output ports electrically coupled to said third communications link for segregating the audio and video television data signals during transmission over said third communications link;
   wherein said software application program comprises and executes a control logic algorithm including the steps of
   upon receipt of one of said instruction signals, requesting the service provider to send the audio and video television data signals along with a random number along with for authentication purposes;
   upon receipt of the audio and video television data signals and said random number, generating and sending command instructions to said cell phone;
   retrieving the audio and video television data signals and said random number;
   transferring and storing the audio and video television data signals in said memory of said communications data interface;
   upon receiving a first user request, displaying the audio and video television data signals on said cell phone;
   upon receiving a second user request, said cell phone returning the audio and video television data signals and said random number to the user; and
   said user sending the audio and video television data signals back to said communication data interface.

5. The cell phone communication system of claim 4, further including the steps of
   said communication data interface receiving and evaluating the audio and video television data signals;
   preparing a control string for downloading a first application component of said control logic algorithm;
   downloading said first application component of said control logic algorithm; and
   determining which television channel has been selected by the user.

6. The cell phone communication system of claim 5, further including the steps of
   assigning a random number to each control within said control string;
   assigning a first encryption code to a first control within said control string
   assigning subsequent encryption codes to subsequent controls of said control string based on preceding encryption codes of preceding controls respectively;
   sending at least one of said encrypted control string and said encrypted controls to said cell phone;
   upon receipt of said at least one encrypted control string and encrypted controls, sending instructions to said data communication interface;
   said data communication interface verifying said at least one encrypted control and encrypted controls respectively; and
   said data communication interface executing said instructions and thereby transmitting the audio and video television data signals to said television display screen.

7. A method for transferring television audio and video data signals between a cell phone and a television display screen, said method comprising the steps of:
   a. providing and communicatively linking a base station to a portable cell phone;
   b. providing and communicatively linking a plurality of portable user interfaces to said base station and said cell phone;

c. said user interfaces generating a plurality of instructions signals based upon receiving a plurality of user inputs;
d. providing first, second and third communications links;
e. transmitting the audio and video television data signals from the television service provider to said cell phone;
f. transmitting the audio and video television data signals from said cell phone to said base station;
g. receiving and verifying said audio and video television data signals received from said cell phone;
h. transmitting the verified television audio and video data signals to said television display screen;
i. simultaneously displaying the audio and video television data signals on said cell phone and said television display screen while said television display screen is not in direct communication with the television service provider;

wherein step i. comprises the steps of:
providing and housing a transceiver within said base station in such a manner that said transceiver is in communication with said cell phone via said second communications link;
providing and housing a communication data interface within said base station such that said communication data interface is electrically coupled to said transceiver;
providing a processor and a memory electrically coupled thereto, said memory including a software application program;
said software application program verifying and formatting the audio and video television data signals received from said cell phone via said second communications link;
said software application program transmitting the audio and video television data signals to the television screen via said third communications link;
providing and electrically coupling audio and video output ports to said third communications link;
said audio and video output ports segregating the audio and video television data signals during transmission over said third communications link;
wherein said software application program comprises and executes a control logic algorithm including the steps of
upon receipt of one of said instruction signals, requesting the service provider to send the audio and video television data signals along with a random number along with for authentication purposes;
upon receipt of the audio and video television data signals and said random number, generating and sending command instructions to said cell phone;
retrieving the audio and video television data signals and said random number;
transferring and storing the audio and video television data signals in said memory of said communications data interface;
upon receiving a first user request, displaying the audio and video television data signals on said cell phone;
upon receiving a second user request, said cell phone returning the audio and video television data signals and said random number to the user; and
said user sending the audio and video television data signals back to said communication data interface.

8. The method of claim 7, wherein said control logic algorithm further includes the steps of
said communication data interface receiving and evaluating the audio and video television data signals;
preparing a control string for downloading a first application component of said control logic algorithm;
downloading said first application component of said control logic algorithm; and
determining which television channel has been selected by the user.

9. The method of claim 8, wherein said control logic algorithm further includes the steps of
assigning a random number to each control within said control string;
assigning a first encryption code to a first control within said control string
assigning subsequent encryption codes to subsequent controls of said control string based on preceding encryption codes of preceding controls respectively;
sending at least one of said encrypted control string and said encrypted controls to said cell phone;
upon receipt of said at least one encrypted control string and encrypted controls, sending instructions to said data communication interface;
said data communication interface verifying said at least one encrypted control and encrypted controls respectively; and
said data communication interface executing said instructions and thereby transmitting the audio and video television data signals to said television display screen.

* * * * *